Dec. 6, 1960     M. J. STUMBOCK     2,962,806
LAMINATED THERMOSTATIC METAL
Filed July 18, 1955
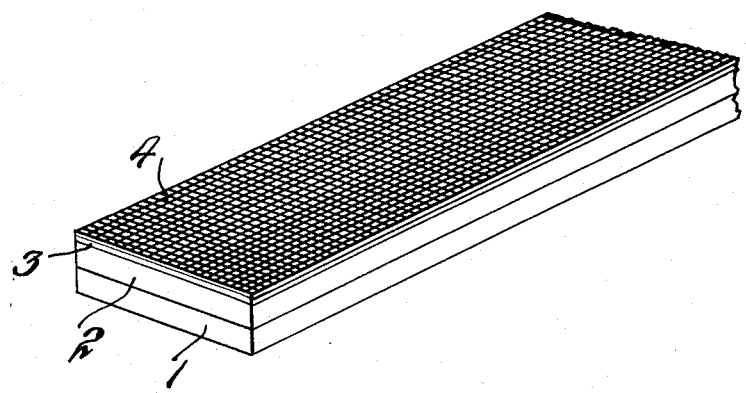
INVENTOR.
Max J. Stumbock
BY
ATTORNEY

United States Patent Office 2,962,806
Patented Dec. 6, 1960

2,962,806

LAMINATED THERMOSTATIC METAL

Max J. Stumbock, South Orange, N.J., assignor, by mesne assignments, to Engelhard Industries, Inc., Newark, N.J., a corporation of Delaware Filed July 18, 1955, Ser. No. 522,420

4 Claims. (Cl. 29—195)

The present invention deals with laminated thermostatic metal, and, more particularly, with laminated metallic members comprising layers of different thermal coefficients of expansion.

A thermostatic metal strip, when subjected to variations in temperature, bends because of the different thermal expansion characteristics of the metals that comprise the strip. Such metals are ordinarily used in the operation of various instruments, e.g. thermostatic control instruments for making and breaking an electrical circuit.

While various combinations of metals for providing a thermostatic member are available, there are conditions under which the response of such thermostatic metals to temperature change is too slow, for example, in control devices for protecting electric apparatus against excessive current, whereupon the electric apparatus is subject to deleterious overheating unless controlled in as short a time as possible.

It is an object of this invention to provide a supersensitive laminated thermostatic metal. It is another object of this invention to provide a laminated thermostatic metal which readily responds to temperature changes within substantially narrow temperature ranges. Other objects of the present invention will become apparent from the description hereinafter following and the drawing forming a part hereof which illustrates a perspective view of a laminated thermostatic metal according to the invention.

The present invention deals with a laminated thermostatic metal comprising a layer or lamina of metal having a substantial high thermal coefficient of expansion bonded to a metal layer or lamina of lower thermal coefficient of expansion, and the metal layer of higher thermal coefficient of expansion being coated with means whereby the response thereof to temperature change is accelerated.

The drawing illustrates, in perspective, a laminated thermostatic metal comprising a layer 1 of lower thermal coefficient of expansion, e.g. a metal layer such as invar (36% nickel and the balance iron), a layer 2 of higher thermal coefficient of expansion, e.g. a metal layer consisting of about 22% nickel, 3% chromium, and the balance iron, a coating 3 of a heat conductor metal such as metal taken from the group consisting of copper and silver, said heat conductive layer coating the surface of the high expansion layer, and a jet black chemically colored coating on the surface of the heat conductor layer. For example, the black coating is preferably a compound commercially available as Ebonol "C" sold under the trademark Ebonol by Enthone, Inc., New Haven, Connecticut.

When the thermostatic layers 1 and 2 are employed without the other layers 3 and 4, the thermostatic metal responds in about 42 seconds under a tempertaure change of about 50° F. when placed at a distance of 1½ inches from a source of heat.

When the combined layers hereinabove described are subjected to identical temperature change conditions, the thermostatic responds in about 11 seconds.

Consequently, it is apparent that the combination described results in an accelerated response to temperature change.

While the examples cited are specific, it is not intended that the invention be limited thereto since some modifications are possible within the scope of the appended claims.

What I claim is:

1. A laminated thermostatic member comprising a lamina of metal having a substantially high thermal coefficient of expansion bonded on one side to a lamina of lower thermal coefficient of expansion, the lamina of high expansion having the other side thereof coated with a thin layer of additional metal of higher heat conductivity than the high expansion lamina, and a black coating on the higher heat conductive metal, only the high expansion lamina being coated with said black coated high conductive metal, said thermostatic member being free to flex upon changes in temperature.

2. A laminated thermostatic member according to claim 1, wherein said heat conductive coating is a metal taken from the group consisting of copper and silver.

3. A laminated thermostatic member according to claim 1, wherein said high expansion layer consists of 22% nickel, 3% chromium, and the balance iron.

4. A laminated thermostatic member according to claim 1, wherein said lower expansion layer consists of 36% nickel and the balance iron.

References Cited in the file of this patent

UNITED STATES PATENTS

| | | |
|---|---|---|
| 496,701 | Sanders | May 2, 1893 |
| 890,895 | Fery | June 16, 1908 |
| 1,140,136 | Eldred | May 18, 1915 |
| 1,718,750 | Marshall | June 25, 1929 |
| 2,144,915 | Derby | Jan. 24, 1939 |
| 2,240,824 | Alban | May 6, 1941 |